United States Patent [19]

Schmidt

[11] 4,071,346

[45] Jan. 31, 1978

[54] APPARATUS FOR THERMAL TEMPERING SHEETS OF GLASS

[75] Inventor: Günther Schmidt, Aachen-Richterich, Germany

[73] Assignee: Saint-Gobain Industries, Neuilly-sur-Seine, France

[21] Appl. No.: 739,037

[22] Filed: Nov. 5, 1976

[30] Foreign Application Priority Data

Nov. 19, 1975 France ............................... 75 35302

[51] Int. Cl.² ............................................ C03B 27/00
[52] U.S. Cl. ....................................... 65/351; 65/348; 239/600
[58] Field of Search ................. 65/348, 349, 350, 351; 239/600

[56] References Cited

U.S. PATENT DOCUMENTS 2,411,701  11/1946  Weihs ..................................... 65/351

OTHER PUBLICATIONS

German Offenlegungsschrift, No. 24-56-795, June 19, 1975, Pelzer, et al.

Primary Examiner—Arthur D. Kellogg
Attorney, Agent, or Firm—Pennie & Edmonds

[57] ABSTRACT

An improved support for holding a plurality of nozzles of a compressed air tempering apparatus in individually adjusted axial position, said support comprising an expandable member relative to which each of the nozzles is axially slidable, and mechanism for expanding the expandable member into pressure holding engagement with each nozzle to hold them in their axially adjusted positions.

12 Claims, 4 Drawing Figures

APPARATUS FOR THERMAL TEMPERING SHEETS OF GLASS

BACKGROUND OF THE INVENTION

The present invention relates to an improvement in compressed air, thermal tempering apparatus for sheets of glass wherein air blast means are employed to effect rapid cooling of the glass. In presently known constructions, the apparatus includes a pair of spaced plenum chambers, each, having a front plate through which a plurality of nozzles extend for directing air onto opposite surfaces of the sheet of glass.

In the case of a known device of this type, the nozzles are designed to be displaced axially of the front plate of the chamber and fixed in a position which is selected for the particular shape of the glass being tempered by means of a tightening device. This tightening device comprises one or more plates adapted to slide parallel to the front plate of the air plenum chamber. These plates are provided with holes aligned with the holes in the front plate of the tank for slidably receiving the nozzles. A construction of this type is disclosed in German Offenlegungsschrift 2456795. In operation, the nozzles are held in position by the shearing effect of the plates sliding one relative to the other. A disadvantage of this type of construction is that the holes provided in the fixed front plate of the plenum chamber and in the sliding plate must coincide very precisely in order to obtain a uniform tightening action on all the nozzles. Accordingly, the structure of these blast heads is precision engineered.

SUMMARY OF THE PRESENT INVENTION

In accordance with the teachings of the present invention, an improved support means for adjustably holding the nozzles is provided. The support means is very simple to construct and does not entail the above mentioned disadvantage. The device according to the invention is characterized in that a flexible expandable means is used to exert a tightening action on the nozzles when placed under expansion forces. The expandable means comprises an inflatable hollow element or elements disposed between the nozzles adjacent the front plate of the plenum chamber. The flexible inflatable hollow elements individually adjust themselves to each of the air blast nozzles and exert the same tightening force on all of the nozzles. It is therefore no longer necessary to construct the holes through the plates with the same degree of precision required with the sliding plate construction of the prior art.

DETAILED DESCRIPTION OF THE PREFERRED EMBODIMENTS

Figure 1:
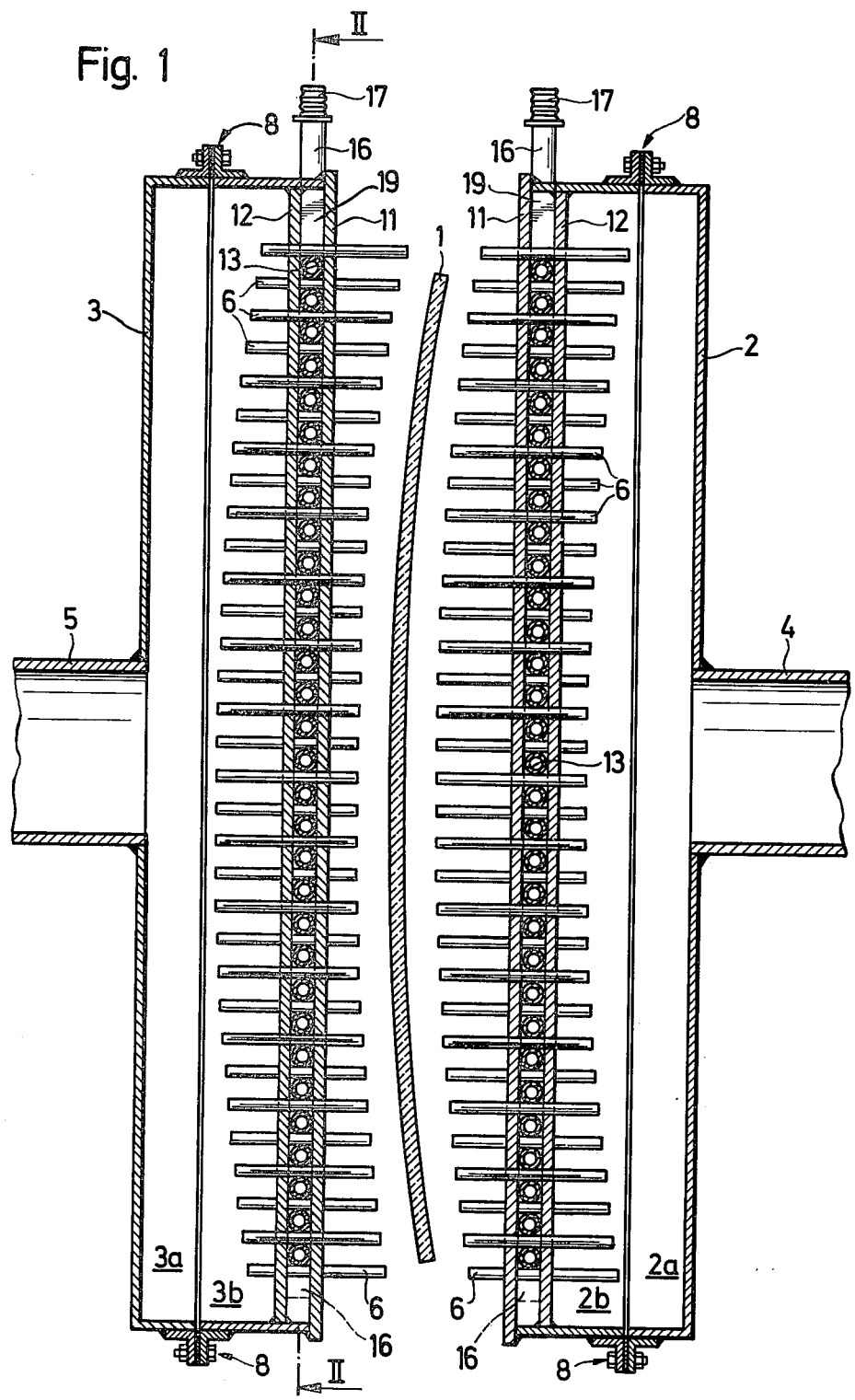
FIG. 1 is a cross-sectional view of a tempering apparatus comprising of two plenum chambers showing the features of the improved nozzle support means of the present invention.

Referring to FIG. 1, a thermal tempering apparatus for a sheet of glass 1 is shown as comprising two plenum chambers tanks 2, 3 disposed opposite one another. Conduits 4 and 5 connect these chambers to blowers. Compressed air in the chambers is discharged through air blast nozzles 6 against opposite surfaces of the glass thereby producing rapid cooling thereof. Blastheads of this type can be disposed either vertically or horizontally for the purpose of tempering sheets of glass in a vertical or horizontal position. Each chamber comprises a rear part to 2a, 3a, and a front removable part 2b, 3b, which is used support the air blast nozzles 6 and which can be replaced by a different part having, for example, a different nozzle arrangement. the two parts of the chamber are screwed to one another and a sealing gasket member 8 is disposed therebetween.

It is necessary for the blast nozzles 6 to be slidable in the direction of their axis, particularly when tempering curved sheets of glass, so that it is possible to regulate the distance between the ends of the nozzles and the sheet of glass and be able to adjust it in dependence on the different shape of a different sheet of glass. A curved sheet of glass 1 is shown in FIG. 1. The apparatus can also be used to efficiently temper flat sheets of glass or sheets of other shapes from that shown in FIG. 1 by simply adjusting the distance between the nozzles and the sheet of glass, and hence the blast air rate and the degree of cooling.

For permitting adjustment of the positioning of the air blast nozzles 6, they are slidably mounted in nozzle support means comprising the front plate 11 of the plenum chamber and a second plate 12 disposed behind the front plate 11. The plates include aligned holes for the passage of the nozzles. To fix the blast nozzles in a given position, the nozzle support means includes a plurality of expandable members in the form of inflatable hoses 13 disposed between adjacent rows of nozzles. These hoses 13 are closed at one end and are connected at the other end to a tube 14. The hoses 13 are rigidly connected to the tubes 14 by means of tightening collars 15. These tubes 14 cross the walls 19 of the air blast head and project from the chamber into the collector or manifold 16 which is connected by means of a connecting piece 17 to a source of compressed air. Valves 18 enabling the inflatable hoses 13 to be independently supplied with compressed air are disposed on each of the tubes 14.

When the hoses 13 are inflated with compressed air they press against the sides of the air blast nozzles 6 and hold them in position. As soon as the hoses 13 are filled with compressed air, the compressed air supply can be shut off.

The holes in the plates 11 and 12 have a slightly larger diameter than that of the nozzles, thus enabling the nozzles to slide in the holes but preventing excessive air leakage into the annular space situated between the front plate 11 and the nozzles. A sealing joint in the form of a rubber collar or sleeve can be provided if necessary.

A factor to be taken into consideration when selecting the material for the hoses 13 is that the air blast tanks can reach fairly high temperatures. Accordingly, material for the hoses is one which does not undergo plastic deformation at high temperatures while retaining its flexible properties. For example, the hoses can be made of silicon rubber and special synthetic types of rubber based on copolymers of butadiene and acyrlonitrile or polychlorobutadiene-based polymerizates which are sold commercially under the trade name PERBUNAN. This material should possess a Shore hardness of approximately 60 and the surface of the hoses should be friction resistant.

Figure 2:
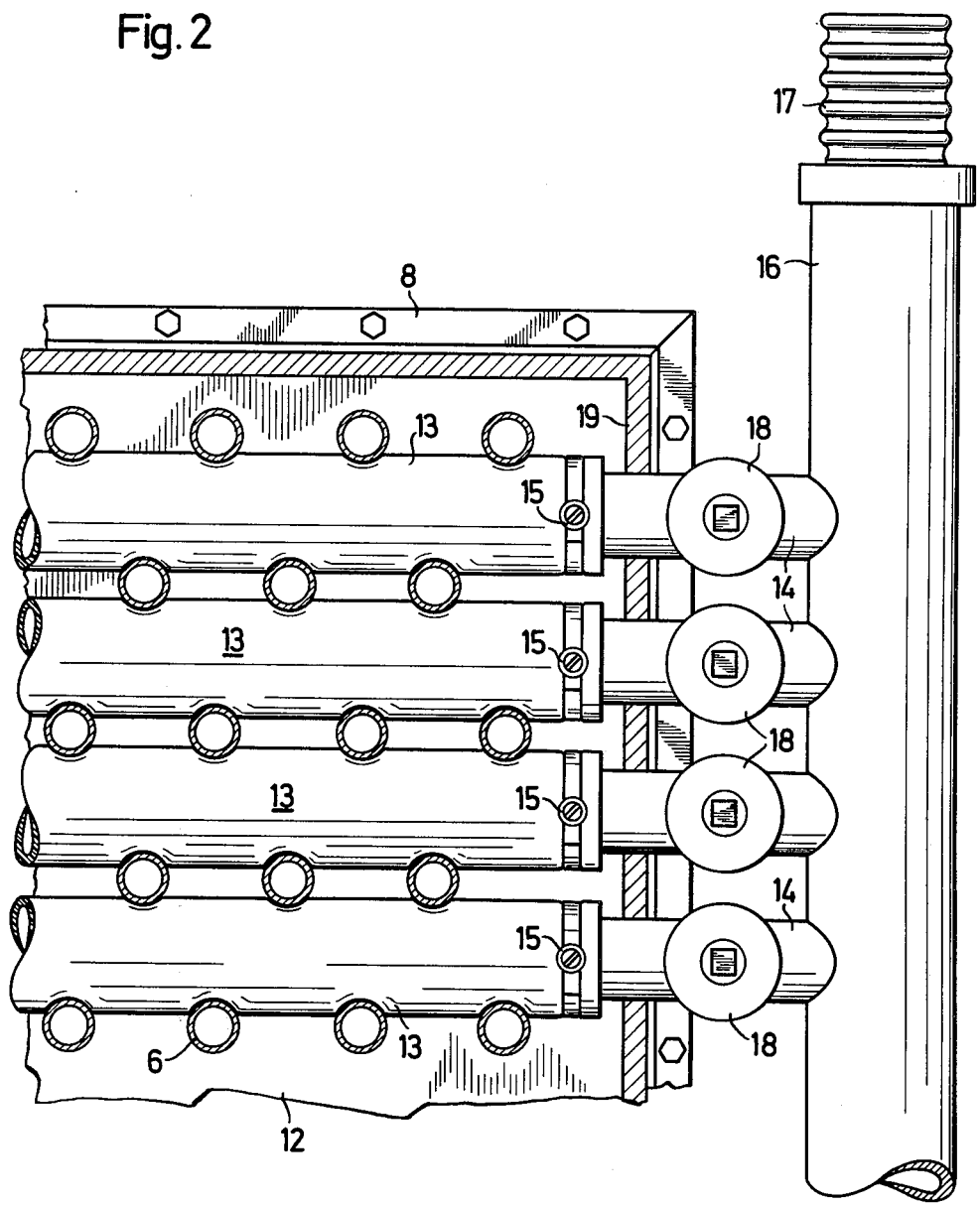
FIG. 2 is a partial, enlarged cross-sectional view taken along the line II—II of FIG. 1.

In place of the arrangement shown in FIG. 2 comprising a plurality of independent hoses connected separately to a collector it is also possible to provide a hose consisting of loops winding between the rows of nozzles. In this way, a single hose can be used for a plurality of nozzle rows and even for all the nozzles.

Figure 3:
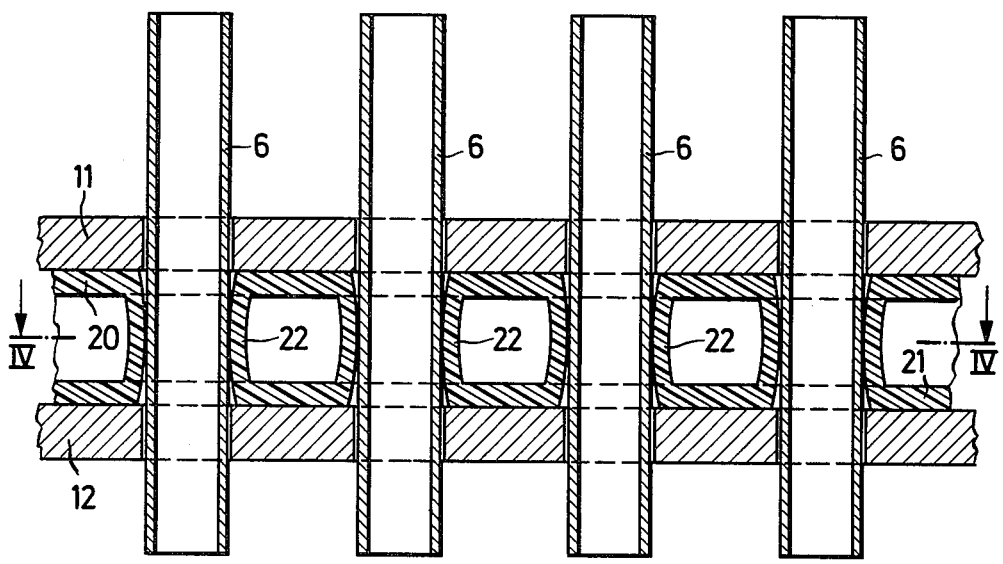
FIG. 3 shows a modified embodiment of the improved nozzle support means of the present invention, taken along line III—III of FIG. 4.
Figure 4:
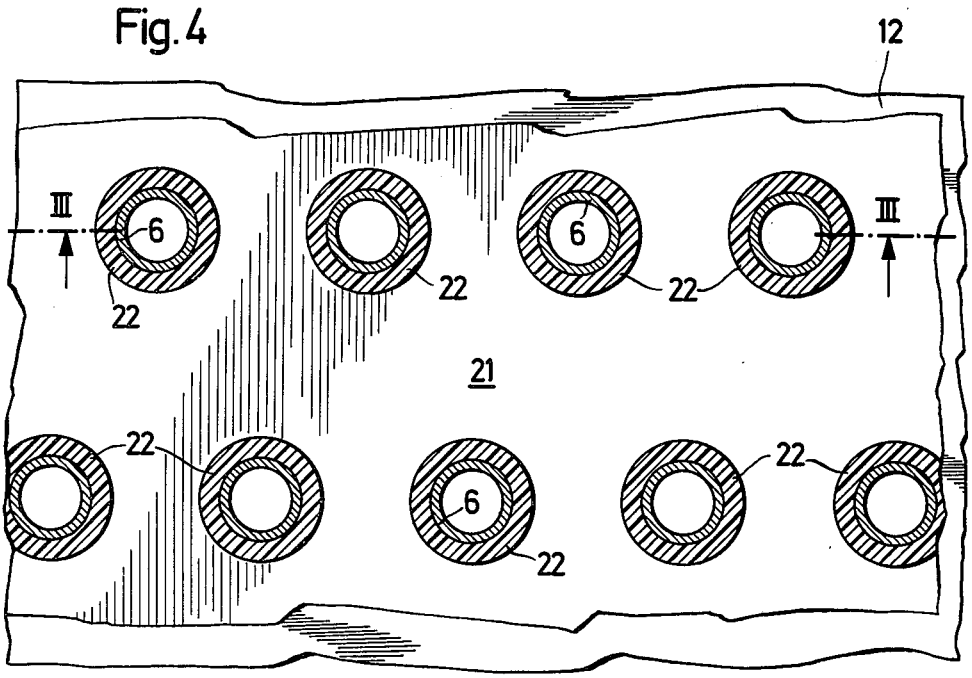
FIG. 4 is a cross-sectional view taken along line IV—IV of FIG. 3.

FIGS. 3 and 4 show another embodiment of the invention for holding the air blast nozzles in their axial adjusted positions. It consists of an expandable member comprised of a single sealed hollow element or member having two plane flat walls 20 and 21 which are respectively positioned against the front plate 11 and the plate 12. The plates together with the hollow member define the front wall of the plenum chamber. Between these walls 20 and 21 the hollow member includes isolated openings 22 consisting of a very flexible material and having the form of cylindrical sections disposed concentrically with respect to the nozzles 6. These openings are in non-fluid communication with the interior of the hollow member for receiving the nozzles therethrough.

When compressed air is applied to the hollow member, the openings 22 become restricted in diameter; and since they surround the airblast nozzles 6, they become pressed against them and to hold them in their axially adjusted positions. This simultaneously results in effecting seal tightness between the nozzles and the interior of the tank.

I claim:

1. In a compressed air tempering apparatus for sheets of glass, said apparatus including a plurality of blast nozzles for directing air against said glass, means for connecting each of said nozzles to a source of compressed air, and nozzle support means for holding said nozzles in individually adjusted axial position, the improvement wherein the nozzle support means includes:
    a. hollow, flexible, inflated expandable means for engaging against the sides of each of said nozzles and with respect to which said nozzles are axially slidable; and
    b. control means for expanding said expandable means laterally into pressure holding engagement with the sides of said nozzles to hold them in their individually adjusted axial positions.

2. In a compressed air tempering apparatus for sheets of glass, said apparatus including a plurality of blast nozzles for directing air against said glass, means for connecting each of said nozzles to a source of compressed air, and nozzle support means for holding said nozzles in individually adjusted axial position, the improvement wherein the nozzle support means includes:
    a. expandable means for engaging against the sides of each of said nozzles and with respect to which said nozzles are axially slidable, said expandable means including a sealed, flexible, hollow member having opposite, spaced, flat side walls and isolated openings extending through said member from one side wall to the other in non-fluid communication with the interior thereof, each of said openings receiving one of said nozzles therethrough; and
    b. control means for expanding said expandable means laterally into pressure holding engagement with the sides of said nozzles to hold them in their individually adjusted axial positions.

3. In a compressed air tempering apparatus for sheets of glass, said apparatus including a plurality of blast nozzles for directing air against said glass, means for connecting each of said nozzles to a source of compressed air, and nozzle support means for holding said nozzles in individually adjusted axial position, the improvement wherein the nozzle support means includes:
    a. expandable means for engaging against the sides of each of said nozzles and with respect to which said nozzles are axially slidable, said expandable means including a sealed, flexible, hollow, inflatable, member having opposite, spaced, flat side walls and isolated openings extending through said member from one side wall to the other in non-fluid communication with the interior thereof, each of said openings receiving one of said nozzles therethrough; and
    b. control means for expanding said expandable means laterally into pressure holding engagement with the sides of said nozzles to hold them in their individually adjusted axial positions, said control means including pneumatic means for inflating said inflatable member into pressure engagement with each of the nozzles extending through the openings therein.

4. In a tempering apparatus according to claim 3 wherein one end of each of said nozzles is connected to a common reservoir of compressed air, the improvement wherein:
    a. said hollow member defines at least part of one wall of said reservoir through which the nozzles extend whereby upon inflation thereof, the hollow member surrounding each of the nozzles engages against each of said nozzles in sealing relation therewith.

5. In a tempering apparatus according to claim 4 the improvement wherein the nozzle support means further comprises:
    a. a pair of spaced plates having aligned holes through which said nozzles slidably extend and which, together with said hollow member, define the one wall of the reservoir, said hollow member being disposed between said plates with its opposite side walls engaging said plate.

6. In a compressed air tempering apparatus for sheets of glass, said apparatus including a plurality of blast nozzles for directing air against said glass, means for connecting each of said nozzles to a source of compressed air, and nozzle support means including plate means having a plurality of holes through which the nozzles slidably extend for individual axial adjustment and a tightening device for holding the nozzles in selected axially adjusted position, the improvement wherein the tightening device of the nozzle support means comprises:
    a. hollow, flexible, inflated expandable means engaging against each of said nozzles at a location adjacent said plate means; and
    b. control means for expanding said expandable means laterally of said plate means and into engagement with the nozzles to press them against the wall surfaces of said holes and hold them in their individually adjusted axial positions.

7. In a compressed air tempering apparatus for sheets of glass, said apparatus including a plurality of blast nozzles for directing air against said glass, means for connecting each of said nozzles to a source of compressed air, and nozzle support means including plate means having a plurality of holes through which the nozzles slidably extend for individual axial adjustment and a tightening device for holding the nozzles in selected axially adjusted position, the improvement wherein the tightening device of the nozzle support means comprises:

a. expandable means engaging against each of said nozzles at a location adjacent said plate means, said expandable means including at least one flexible, inflatable hollow member engaging against each of said nozzles; and
  b. control means for expanding said expandable means laterally of said plate means and into engagement with the nozzles to press them against the wall surfaces of said holes and hold them in their individually adjusted axial positions, said control means including pneumatic means for inflating said hollow member into pressure engagement with each of said nozzles.

8. In a tempering apparatus according to claim 7, the improvement wherein:

a. said flexible hollow member includes a single inflatable flexible tube looped between the nozzles and disposed in engagement with each of said nozzles when inflated.

9. In a tempering apparatus according to claim 7 having the nozzles arranged in spaced rows, the improvement wherein:

a. said flexible hollow member includes an inflatable flexible tube extending between each of the rows of nozzles with each tube engaging the nozzles in the two immediately adjacent rows when inflated.

10. In a tempering apparatus according to claim 9, the improvement further including:

a. a manifold connected to a source of pneumatic fluid; and
  b. conduit means connecting each of said flexible tubes to said manifold.

11. In a tempering apparatus according to claim 10, the improvement further including:

a. a control valve connected in each conduit between said manifold and each of said tubes for controlling flow of pneumatic fluid thereto.

12. In a tempering apparatus according to claim 9, the improvement wherein:

a. the plate means includes a pair of spaced plates having aligned holes for slidably receiving said nozzles therein; and
  b. said flexible tubes are disposed between said plates.

* * * * *